| (12) | United States Patent<br>Buerger et al. | (10) Patent No.: US 10,500,914 B2<br>(45) Date of Patent: Dec. 10, 2019 |
|---|---|---|

(54) CONNECTING ROD FOR A MULTIPLE CONNECTING ROD AXLE OF A MOTOR VEHICLE

(71) Applicant: KSM Castings Group GmbH, Hildesheim (DE)

(72) Inventors: Florian Buerger, Ilsede (DE); Christian Richard, Harsum (DE); Christian Moschner, Lengede (DE); Klaus Greven, Hildesheim (DE); Oliver Grimm, Ahlten (DE); Manikandan Loganathan, Hildesheim (DE)

(73) Assignee: KSM Castings Group GmbH, Hildesheim (DE)

( * ) Notice: Subject to any disclaimer, the term of this patent is extended or adjusted under 35 U.S.C. 154(b) by 113 days.

(21) Appl. No.: 15/865,475

(22) Filed: Jan. 9, 2018

(65) Prior Publication Data

US 2018/0195609 A1 Jul. 12, 2018

(30) Foreign Application Priority Data

Jan. 10, 2017 (DE) .................. 10 2017 100 327

(51) Int. Cl.
*B60G 3/20* (2006.01)
*B60G 7/00* (2006.01)
*F16C 11/04* (2006.01)
*F16H 21/34* (2006.01)
*F16C 7/02* (2006.01)

(52) U.S. Cl.
CPC ............. *B60G 7/006* (2013.01); *B60G 3/20* (2013.01); *B60G 7/001* (2013.01); *F16C 7/02* (2013.01); *F16C 11/04* (2013.01); *F16H 21/34* (2013.01); *B60G 2204/1162* (2013.01); *B60G 2204/129* (2013.01); *B60G 2204/1244* (2013.01); *B60G 2206/014* (2013.01); *B60G 2206/017* (2013.01); *B60G 2206/124* (2013.01);
(Continued)

(58) Field of Classification Search
CPC ....... F16J 1/14; F16J 7/02; F16J 11/04; B60G 7/001; B60G 17/0164; B60G 17/01908; B60G 7/02; B60G 13/00; B60G 7/006; B60G 7/008; B60G 9/006; B60G 9/027; B60G 3/20
See application file for complete search history.

(56) References Cited

U.S. PATENT DOCUMENTS 2,888,271 A * 5/1959 Butterfield ............... B60G 9/00
280/124.179
6,109,653 A * 8/2000 Maruyama ............... B60G 7/02
280/124.151
(Continued)

*Primary Examiner* — Syed O Hasan
(74) *Attorney, Agent, or Firm* — Collard & Roe, P.C.

(57) ABSTRACT

A connecting rod for a multiple connecting rod axle of a motor vehicle, especially a lower wishbone for a multiple connecting rod rear axle, includes a substantially Y-shaped basic framework with a first arm, the free end region of which has a first seat for linking the connecting rod to an auxiliary frame or a vehicle body, with a second arm, the free end region of which has a second seat for linking the connecting rod to the auxiliary frame rod or the vehicle body, and with a third arm, the free end region of which has a third seat for linking the connecting rod to a wheel carrier. The connecting rod is manufactured in one piece with the seats.

30 Claims, 4 Drawing Sheets

(52) U.S. Cl.
CPC ........... *B60G 2206/7102* (2013.01); *B60G 2206/8101* (2013.01); *F16C 2326/05* (2013.01)

(56) References Cited

U.S. PATENT DOCUMENTS

| | | | | |
|---|---|---|---|---|
| 8,020,882 B2 * | 9/2011 | D'Aponte | ............... | B60G 3/202 280/124.133 |
| 2015/0343868 A1 * | 12/2015 | Stenzenberger | ....... | B60G 3/285 280/124.11 |
| 2017/0015173 A1 * | 1/2017 | Battaglia | .................. | B60G 3/18 |

* cited by examiner

CONNECTING ROD FOR A MULTIPLE CONNECTING ROD AXLE OF A MOTOR VEHICLE

CROSS REFERENCE TO RELATED APPLICATIONS

Applicant claims priority under 35 U.S.C. § 119 of German Application No. 10 2017 100 327.4 filed Jan. 10, 2017, the disclosure of which is incorporated by reference.

BACKGROUND OF THE INVENTION

1. Field of the Invention

The invention relates to a connecting rod for a multiple connecting rod axle of a motor vehicle.

2. Description of the Related Art

A multiple connecting rod axle is a wheel suspension with several connecting rods per wheel, usually used on the rear axle but also used on the front axle of motor vehicles. For this purpose, a large number of possible constructions of individual connecting rods is known.

SUMMARY OF THE INVENTION

The task underlying the invention is to provide an alternative to connecting rods of the class in question, especially a connecting rod with optimized weight and/or stability.

This task is accomplished by a connecting rod with the features according to the invention. Improvements and advantageous configurations of the invention are discussed below.

The connecting rod according to the invention for a multiple connecting rod axle of a motor vehicle, especially the lower wishbone, according to the invention, for a multiple connecting rod rear axle, comprises a substantially Y-shaped basic framework with a first arm, a second arm, and a third arm. The free end region of the first arm has a first seat for linking the connecting rod to an auxiliary frame or a vehicle body. The free end region of the second arm has a second seat for linking the connecting rod to the auxiliary frame or the vehicle body. The free end region of the third arm has a third seat for linking the connecting rod to a wheel carrier. The connecting rod is manufactured in one piece with the seats.

The first and the second seats are preferably formed to be sleeve-like. In the installed condition of the connecting rod, these are preferably aligned in travel direction. It may be expedient if both the first and also the second seat have a rubber bearing for mounting on the auxiliary frame or vehicle body. The third seat is preferably formed for accommodation of a ball joint, via which the connecting rod is mounted on the wheel carrier or axle arm.

It may be advantageous if, in the installed condition of the connecting rod, the first arm is positioned in travel direction forward of the second arm.

It may be advantageous if a dish-like seat for a spring, preferably a helical spring, is disposed at least partly between two arms, preferably between the first arm and the third arm.

For some applications, it may be advantageous if the seat is formed for the accommodation of a helical spring. For other applications, it may be advantageous if the seat is formed for the accommodation of a helical spring.

It may be advantageous if, in the installed condition of the connecting rod, the dish-like seat is disposed laterally at approximately the height of the point of intersection of the three arms. In the installed condition of the connecting rod, the dish-like seat is preferably disposed forward of the point of intersection in travel direction.

It may be advantageous if the dish-like seat is formed so that an arrangement of the spring on the dish-like seat is provided on that side of the connecting rod which in the installed condition of the connecting rod points away from the roadway.

It may be advantageous if the dish-like seat on that side of the connecting rod which in the installed condition of the connecting rod points away from the roadway is at least partly curved inwardly.

It may be advantageous if the rim of the dish-like seat is joined at least partly via at least one connecting region to at least one of the arms between which the dish-like seat is disposed.

It may be advantageous if a flat connecting region is provided that at least partly continues the curvature of the dish-like seat, preferably on the side of the dish-like seat which in the installed condition of the connecting rod is rearward in travel direction.

It may be advantageous if the flat connecting region has one or more than one weight-reducing recess in the form of a perforation and/or a cavity open at one end.

It may be advantageous if a connecting region is provided in the form of a rib-like reinforcing element which, in the installed condition of the connecting rod, starting substantially from the first seat, runs along the side which is forward or the rim which is forward, in the travel direction, of the dish-like seat and ends in the region of the third seat.

It may be advantageous if a portion of the reinforcing element, a portion of the dish-like seat and/or a portion of the third arm encloses at least one preferably through-going recess.

It may be advantageous if a preferably rib-like stiffening element is provided on that side of the connecting rod which in the installed condition of the connecting rod points toward the roadway.

It may be advantageous if the stiffening element, starting substantially from the first seat, leads via the dish-like seat and ends in the region of the third seat.

It may be advantageous if the connecting rod has a seat for the fastening of a shock absorber.

It may be advantageous if the seat for the fastening of the shock absorber is disposed in the third arm.

It may be advantageous if the seat for the fastening of the shock absorber is formed to be open at one end on the side which in the installed condition of the connecting rod is rearward in travel direction. Preferably the seat is formed in such a way that a bearing journal, preferably of steel, can be introduced, preferably screwed into it, and the shock absorber is then mounted on this bearing journal.

It may be advantageous if the connecting rod has a seat for fastening a stabilizer.

It may be advantageous if the seat for fastening the stabilizer is disposed in the region of the point of intersection of the arms.

It may be advantageous if the seat for fastening the stabilizer is formed to be open at one end on the side which in the installed condition of the connecting rod is rearward in the travel direction.

It may be advantageous if the first arm merging into the point of intersection widens toward the point of intersection in at least one portion, preferably over its length.

It may be advantageous if the second arm has one or more than one weight-reducing recess in the form of a perforation and/or a cavity open at one end.

It may be advantageous if the at least one recess is provided within the second connecting rod on that side of the connecting rod which in the installed condition of the connecting rod points away from the roadway.

It may be advantageous if the at least one recess extends preferably for the most part over the length of the second arm, preferably in such a way that the long sides of the recess are formed by two reinforcing ribs spaced apart from one another.

It may be advantageous if the recess is subdivided into compartments by at least one stiffening longitudinal and/or preferably transverse wall.

It may be advantageous if the third arm has one or more than one weight-reducing recess in the form of a perforation and/or a cavity open at one end.

It may be advantageous if the recess is disposed between the seat for fastening of the shock absorber and the seat for fastening of the stabilizer, preferably on that side of the connecting rod which in the installed condition of the connecting rod points away from the roadway.

It may be advantageous if a stiffening flat element is provided which, in the installed condition of the connecting rod, is disposed on the side which is rearward in the travel direction, between the second seat, the seat for fastening of the stabilizer and/or the seat for fastening of the shock absorber, and is connected to the adjoining arms.

It may be advantageous if the flat element, beginning at the second seat, ends underneath the seat for fastening of the stabilizer to the seat for fastening of the shock absorber.

It may be advantageous if a stiffening flat element is provided which, in the installed condition of the connecting rod, is disposed on the side which is forward in the travel direction, in a portion in the region of the first seat and the reinforcing element, and is connected therewith.

It may be advantageous if the flat element is formed to be substantially planar.

It may be advantageous if at least one recess has at least one through bore in the bottom for a water drain.

It may be advantageous if at least three seats for fastening of a guard plate are disposed on that side of the connecting rod which, in the installed condition of the connecting rod, points in travel direction toward the roadway.

It may be advantageous if the connecting rod is manufactured from lightweight metal, preferably from an aluminum alloy.

It may be advantageous if the connecting rod is manufactured in an aluminum casting process, preferably in the counter pressure casting process.

It may be advantageous if the seats are machined after the casting of the connecting rod.

It may be advantageous if the connecting rod is cast in one piece with all seats.

It may be advantageous if the arms of the connecting rod are not hollow-cast.

It may be advantageous if the connecting rod consists of an Al cast alloy that contains the alloying components listed below
Si: >3.8 to 5.8 wt %
Mg: 0.45 to 0.55 wt %
Cr: 0.05 to 0.5 wt %
Sr: 0.010 to 0.030
Impurities: <0.1 wt %
and is respectively made up to 100 wt % with Al.

The selection, according to the invention, of alloying components in this order of magnitude leads to an improvement of castability without adversely influencing the mechanical properties of the connecting rod.

The alloy may contain manufacturing-related impurities.

It may be advantageous if the permissible admixture of P is at most 10 ppm. It may be advantageous if the permissible admixture of Ca is at most 20 ppm. It may be advantageous if the permissible admixture of Sb is at most 40 ppm. It may be advantageous if the permissible admixture of Cd is at most 75 ppm. It may be advantageous if the permissible admixture of Na is at most 15 ppm. It may be advantageous if the permissible admixture of Na is at most 15 ppm. It may be advantageous if permissible admixtures of other alloying components are respectively at most 0.03 wt % individually, but in total, as already mentioned, are at most 0.10 wt %.

To optimize the castability without adversely influencing mechanical characteristics of the cast component to be cast, it may be advantageous if Si is present in a content of more than 4.0 wt %, preferably of at least 4.5 wt %, particularly preferably of at least 4.7 wt %, quite particularly preferably of at least 4.9 wt %. To optimize the castability without adversely influencing mechanical characteristics of the cast component to be cast, it may be advantageous if Si is present in a content of at most 5.5 wt %, preferably of at most 5.3 wt %, particularly preferably of at most 5.1 wt %.

To optimize the castability without adversely influencing mechanical characteristics of the cast component to be cast, it may be advantageous if Mg is present in a content of more than 0.45 wt %, preferably of at least 0.47 wt %, particularly preferably of 0.49 wt %. To optimize the castability without adversely influencing mechanical characteristics of the cast component to be cast, it may be advantageous if Mg is present in a content of less than 0.55 wt %, preferably of at most 0.53 wt %, particularly preferably of at most 0.51 wt %.

To optimize of the castability without adversely influencing mechanical characteristics of the cast component to be cast, it may be advantageous if Cr is present in a content of more than 0.05 wt %, preferably of at least 0.07 wt %, particularly preferably of at least 0.09 wt %, quite particularly preferably of at least 0.11 wt %. To optimize the castability without adversely influencing mechanical characteristics of the cast component to be cast, it may be advantageous if Cr is present in a content of less than 0.250 wt %, preferably of less than 0.20 wt %, particularly preferably of less than 0.18 wt %, quite particularly preferably of less than 0.15 wt % most particularly preferably of less than 0.13 wt %.

To optimize the castability without adversely influencing mechanical characteristics of the cast component to be cast, it may be advantageous if Fe is present in a content of less than 0.18 wt %, preferably of up to 0.15 wt %, particularly preferably in a content of up to 0.12 wt %. To optimize the castability without adversely influencing mechanical characteristics of the cast component to be cast, it may be advantageous if Fe is present in a content of at least 0.01 wt %.

To optimize the castability without adversely influencing mechanical characteristics of the cast component to be cast, it may be advantageous if Mn is present in a content of up to 0.06 wt %, preferably of up to 0.05 wt %, particularly preferably of up to 0.03 wt %. To optimize the castability without adversely influencing mechanical characteristics of the cast component to be cast, it may be advantageous if Mn is present in a content at least 0.01 wt %.

To optimize the castability without adversely influencing mechanical characteristics of the cast component to be cast, it may be advantageous if Ti is present in a content of less than 0.2 wt %, preferably of up to 0.03 wt %. T optimize the castability without adversely influencing mechanical characteristics of the cast component to be cast, it may be advantageous if Ti is present in a content of at least 0.005 wt %, preferably of at least 0.010 wt %, particularly preferably of more than 0.015 wt %. To optimize the castability without adversely influencing mechanical characteristics of the cast component to be cast, it may be advantageous for some applications if Ti is present in a content of at least 0.05 wt %, preferably of at least 0.10 wt %, particularly preferably of more than 0.15 wt %.

To optimize the castability without adversely influencing mechanical characteristics of the cast component to be cast, it may be advantageous if Cu is present in a content of up to 0.03 wt %, preferably of up to 0.015 wt %, preferably of up to 0.01 wt %, particularly preferably of up to 0.0075 wt %. To optimize the castability without adversely influencing mechanical characteristics of the cast component to be cast, it may be advantageous if Cu is present in a content of at least 0.001 wt %, preferably of at least 0.0025 wt %, particularly preferably of at least 0.005 wt %.

To optimize the castability without adversely influencing mechanical characteristics of the cast component to be cast, it may be advantageous if Sr is present in a content of at least 0.015 wt %, preferably of at least 0.019 wt %. To optimize the castability without adversely influencing mechanical characteristics of the cast component to be cast, it may be advantageous if Sr is present in a content of up to 0.025 wt %, preferably of up to 0.024 wt %.

To optimize the castability without adversely influencing mechanical characteristics of the cast component to be cast, it may be advantageous if Zr is present in a content of less than 0.006 wt %, preferably of 0.001 wt % to 0.005 wt %.

To optimize the castability without adversely influencing mechanical characteristics of the cast component to be cast, it may be advantageous if Zn is present in a content of less than 0.006 wt %, preferably of 0.001 wt % to 0.005 wt %.

It may be advantageous if impurities are present all together in a content of <0.05 wt %. It may be advantageous if impurities are present individually in a content of <0.005 wt %.

It may be advantageous if the cast connecting rod is subjected to a two-stage heat treatment, namely solution annealing and a subsequent artificial aging. It may be advantageous if the cast connecting rod is quenched in air or preferably water between the two head-treatment stages.

It may be advantageous if the cast connecting rod, after the casting process, is solution-annealed between 530° C. and 550° C. for 6 hours to 10 hours, preferably between 540° C. and 550° C. for 7 hours to 9 hours, especially for 8 hours to 9 hours, quite particularly preferably between higher than 540° C. and 550° C. for 7 hours to 9 hours, especially for 8 hours to 9 hours.

It may be advantageous if the cast connecting rod, after the casting process, is tempered between 180° C. and 210° C. for 1 to 8 hours, especially for 1 hour to 6.5 hours, preferably between 180° C. and 190° C. for 1 hour to 6.5 hours, especially for 4 hours to 6.5 hours, particularly preferably between 180° C. and lower than 190° C. for 4 hours to 6.5 hours, especially for 5 hours to 6.5 hours.

Connecting rods according to the invention, which are manufactured from an aforementioned Al cast alloy, are characterized in that, despite the improved castability, no disproportionately negative influence is imposed on their mechanical characteristics acquired after a heat treatment, especially the offset yield strength $R_p0.2$ of 300 MPa to 325 MPa, preferably of 305 MPa to 310 MPa, and/or the elongation to break A5 of 4% to 10%, preferably of 7% to 9%, and/or the tensile strength $R_m$ of 350 MPa-375 MPa, preferably of 350 MPa-360 MPa.

BRIEF DESCRIPTION OF THE DRAWINGS

Improvements and advantageous configurations of the invention may also become apparent from the following descriptions of exemplary embodiments, which are illustrated in the drawing. Features essential to the invention may also become apparent from the arrangement of individual core regions and/or recesses and/or seats relative to one another. It is to be understood, however, that the drawings are designed as an illustration only and not as a definition of the limits of the invention.

In the drawings.

DETAILED DESCRIPTION OF THE PREFERRED EMBODIMENTS

Figure 1:
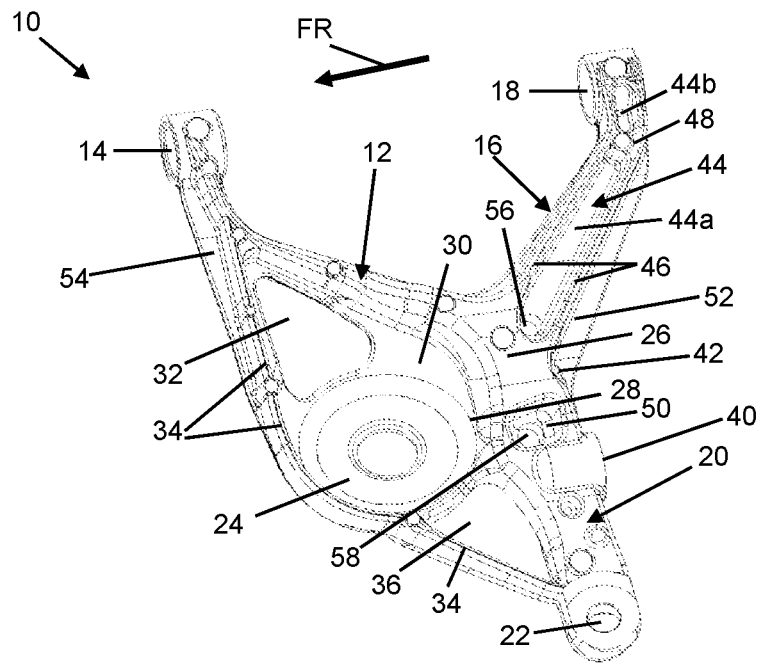
FIG. 1 shows a first perspective diagram of a connecting rod according to the invention.
Figure 2:
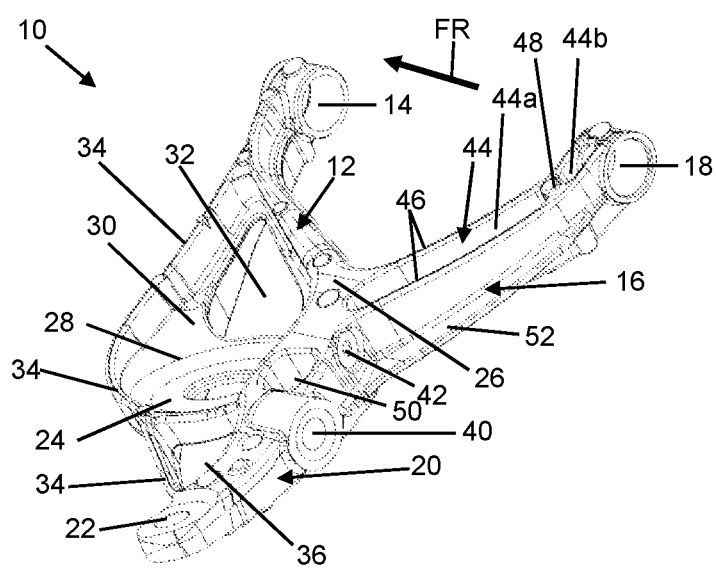
FIG. 2 shows a second perspective diagram of the connecting rod according to the invention.
Figure 3:
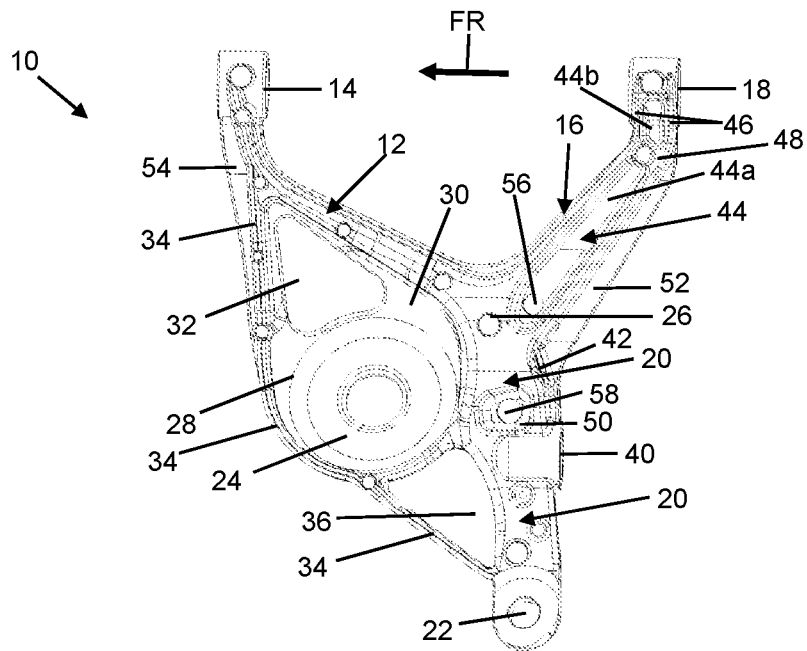
FIG. 3 shows an overhead view of the connecting rod according to the invention.

The connecting rod 10 according to the invention, illustrated in the figures, is a left, lower wishbone for a multiple connecting rod rear axle and comprises a substantially Y-shaped basic framework with a first arm 12, the free end region of which has a first seat 14 for linking the connecting rod 10 to an auxiliary frame, not illustrated here, with a second arm 16, the free end region of which has a second seat 18 for linking the connecting rod 10 to the auxiliary frame, not illustrated here, and with a third arm 20, the free end region of which has a third seat 22 for linking the connecting rod 10 to a wheel carrier or axle arm, wherein the connecting rod 10 is manufactured in one piece with the seats 14, 18, 22.

In the installed condition of the connecting rod 10, the first arm 12 is positioned in travel direction FR forward of the second arm 16.

In each case, a dish-like seat 24 for a spring is disposed at least partly between the first arm 12 and the third arm 20.

The dish-like seat 24 is disposed laterally approximately at the height of the point of intersection 26 of the three arms 12, 16, 18 and is formed in such a way that an arrangement of the spring on the dish-like seat 24 is provided on that side of the connecting rod 10 which in the installed condition of the connecting rod 10 points away from the roadway.

The dish-like seat 24 is at least partly curved inwardly in each case on that side of the connecting rod 10 which in the installed condition of the connecting rod 10 points away from the roadway.

The rim 28 of the dish-like seat 24 is joined at least partly via at least one connecting region 30, 34 to the arms 12, 20, between which the dish-like seat 24 is disposed.

A flat connecting region 30 is provided, which in each case at least partly continues the curve of the dish-like seat 24 on the side of the dish-like seat 24 which in the installed condition of the connecting rod 10 is rearward in travel direction.

The flat connecting region 30 has a weight-reducing recess 32 in the form of a perforation.

Furthermore, a connecting region is provided in the form of a preferably rib-like reinforcing element 34 which, in the installed condition of the connecting rod 10, starting substantially from the first seat 14, runs along the side of the dish-like seat 24 which is forward in travel direction FR and ends preferably in the region of the third seat 22.

A portion of the reinforcing element 34, a portion of the dish-like seat 24 and/or a portion of the third arm 20 enclose at least one preferably through-going recess 36.

Figure 4:
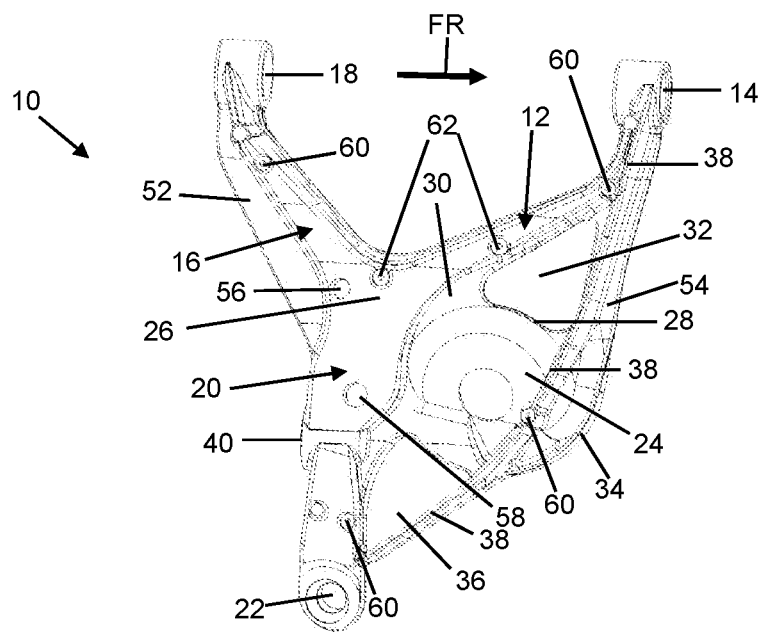
FIG. 4 shows a rear view of the connecting rod according to the invention.
Figure 5:
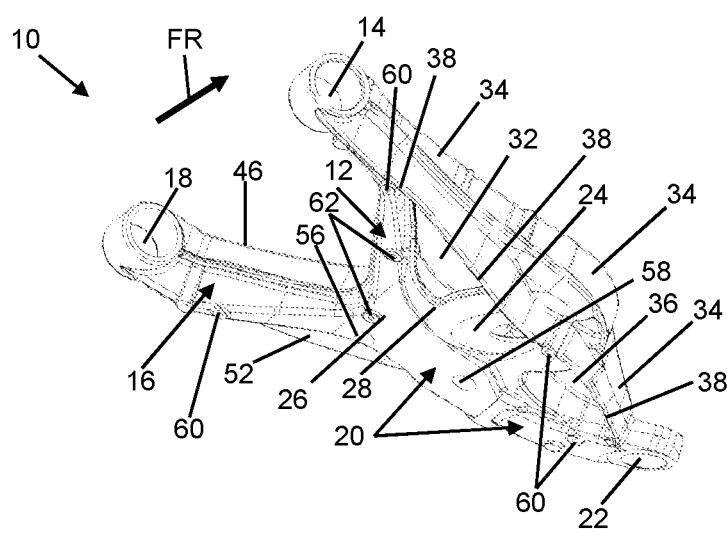
FIG. 5 shows a perspective view of the connecting rod according to the invention.
Figure 6:
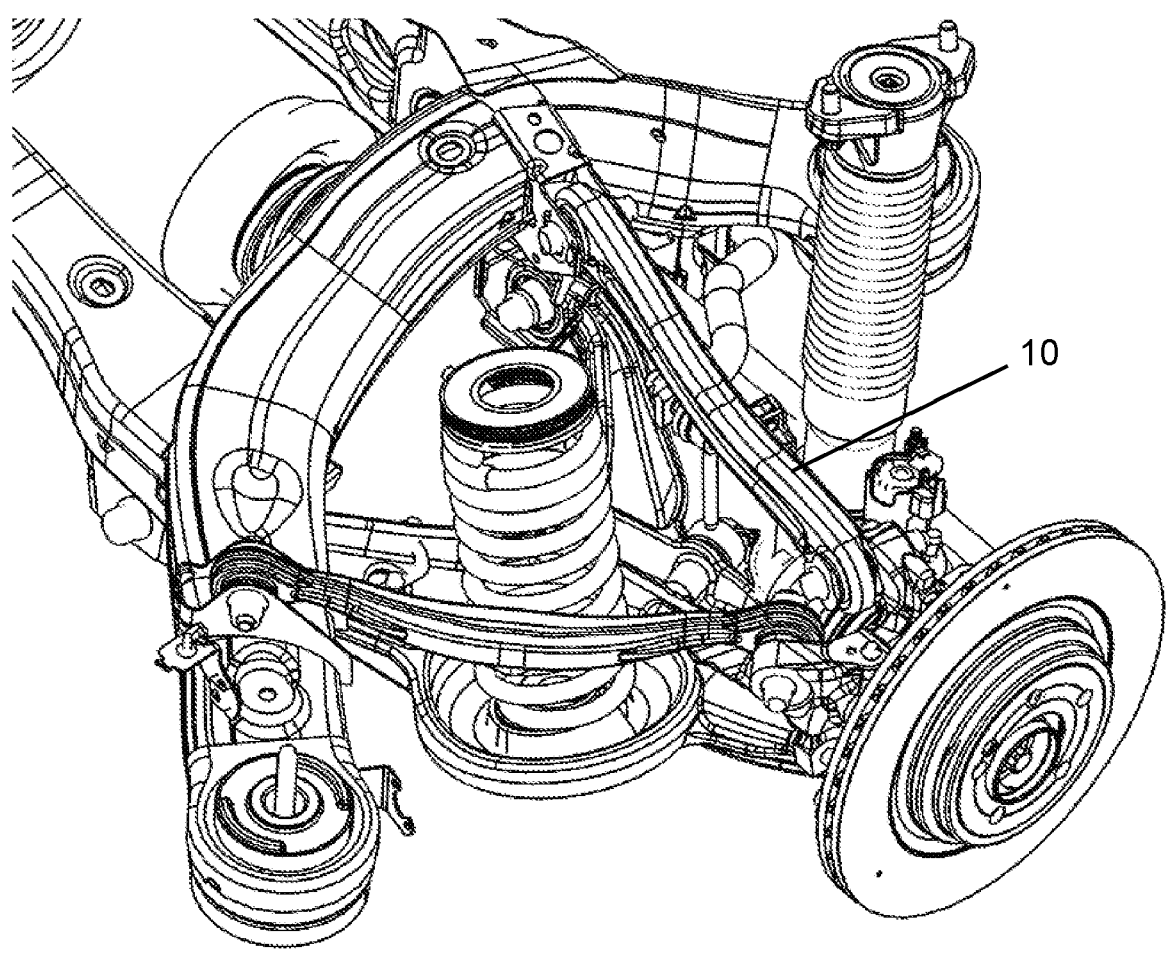
FIG. 6 shows a perspective view of the connecting rod according to the invention connected to a subframe of a car.

A rib-like stiffening element 38 (FIG. 4) is provided on that side of the connecting rod 10 which in the installed condition of the connecting rod 10 points toward the roadway.

The stiffening element 38, starting substantially from the first seat 14, leads via the dish-like seat 24 and ends preferably in the region of the third seat 22.

Moreover, the connecting rod 10 has a seat 40 for the fastening of a shock absorber, not illustrated here.

The seat 40 for the fastening of the shock absorber is disposed in the third arm, wherein the seat 40 is formed to be open at one end on the side which in the installed condition of the connecting rod 10 is rearward in travel direction.

Furthermore, the connecting rod 10 has a seat 42 for the fastening of a stabilizer.

The seat 42 for the fastening of the stabilizer is disposed in the region of the point of intersection 26 of the arms 12, 16, 20 and is formed to be open at one end on the side which in the installed condition of the connecting rod 10 is rearward in travel direction FR.

The first arm 12 merging into the point of intersection 26 widens toward the point of intersection 26 in at least one portion, preferably over its length.

The second arm 16 has a weight-reducing recess 32 in the form of a cavity open at one end, wherein the recess 44 is subdivided into two compartments 44a, 44b by a stiffening transverse wall 48.

The at least one recess 32 is provided within the second connecting rod 16 on that side of the connecting rod 10 which in the installed condition of the connecting rod 10 points away from the roadway.

The recess 44 extends for the most part over the length of the second arm 16, in such a way that the long sides of the recess 44 are formed by two reinforcing ribs 46 spaced apart from one another.

The third arm 20 has a further weight-reducing recess 50 in the form of a cavity open at one end.

This recess 50 is disposed between the seat 40 for fastening of the shock absorber and the seat 42 for fastening of the stabilizer, and specifically on that side of the connecting rod 10 which in the installed condition of the connecting rod 10 points away from the roadway.

The recesses 44, 50 respectively have a through bore 56, 58 in the bottom for a water drain.

A stiffening flat element 52 is provided which, in the installed condition of the connecting rod 10, is disposed on the side which is rearward in travel direction FR, between the second seat 18, the seat 42 for fastening of the stabilizer and the seat 40 for fastening of the shock absorber, and is connected to the adjoining arms 16, 20.

The flat element 52 is formed to be substantially planar. The wall of the flat element 52 which in the installed condition of the connecting rod 10 is rearward in travel direction FR may have at least one indentation.

The flat element 52 begins at the height of the second seat 18 and ends underneath the bores provided in the seats 40, 42.

A further stiffening flat element 54 is provided which, in the installed condition of the connecting rod 10, is disposed on the side which is forward in travel direction FR, in a portion in the region of the first seat 14 and the reinforcing element 34, and is connected with the first seat 14 and the reinforcing element 34.

The stiffening flat element 54 is formed to be substantially planar.

Four seats 60 (FIG. 4) for fastening of a cover, preferably for improvement of the aerodynamics and/or as protection against stone impact, especially in the form of a guard plate, are disposed on that side of the connecting rod 10 which, in the installed condition of the connecting rod 10, points in travel direction FR toward the roadway.

Two seats 62 for fastening of a sensor are advantageously provided on that side of the connecting rod 10 which, in the installed condition of the connecting rod 10, points in travel direction FR toward the roadway.

The connecting rod 10 is manufactured from an aluminum alloy in an aluminum casting process, namely in the counter pressure casting process. The gating takes place preferably in the region of the point of intersection of the three arms 12, 16 and 20 from that side of the connecting rod 10 which, in the installed condition of the connecting rod 10, points in travel direction FR toward the roadway.

The connecting rod 10 in one embodiment is connected to a subframe of a car.

The seats are machined after the casting.

According to the invention, the connecting rod 10 is cast in one piece with all seats.

Although only at least one embodiment of the present invention has been shown and described, it is to be understood that many changes and modifications may be made thereunto without departing from the spirit and scope of the invention.

What is claimed is:

1. A connecting rod for a multiple connecting rod axle of a motor vehicle comprising: a substantially Y-shaped basic framework comprising a first arm, a second arm, and a third arm; a dish-shaped seat for a spring, the dish-shaped seat being disposed at least partly between the first arm and the third arm; and a rib-shaped stiffening element provided on a side of the connecting rod which in the installed condition of the connecting rod points toward the roadway; wherein the first arm comprises a first free end region having a first seat for linking the framework to an auxiliary frame or a vehicle body; wherein the second arm comprises a second free end region having a second seat for linking the framework to the auxiliary frame or the vehicle body; wherein a third arm comprises a third free end region having a third seat for linking the framework to a wheel carrier; and wherein the framework is manufactured in one piece with the first, second, and third seats; wherein, in an installed condition of the connecting rod, the first arm is positioned in a travel direction forward of the second arm; and wherein the stiffening element starts substantially from the first seat, runs across the dish-shaped seat, and ends in the third free end region.

2. The connecting rod according to claim 1, wherein the dish-shaped seat is disposed laterally approximately at a height of a point of intersection of the first, second, and third arms.

3. The connecting rod according to claim 1, wherein the dish-shaped seat is formed so that an arrangement of the spring on the dish-shaped seat is provided on a side of the connecting rod pointing away from the roadway in the installed condition of the connecting rod.

4. The connecting rod according to claim 3, wherein the dish-shaped seat is at least partly curved inwardly on the side of the connecting rod pointing away from the roadway in the installed condition of the connecting rod.

5. The connecting rod according to claim 1, wherein the dish-shaped seat has a rim joined at least partly via at least one connecting region to at least one of the arms between which the dish-shaped seat is disposed.

6. The connecting rod according to claim 1, further comprising a flat connecting region that continues a curvature of the dish-like seat at least partly.

7. The connecting rod according to claim 6, wherein the flat connecting region has at least one weight-reducing recess comprising at least one of a perforation and a cavity open at one end.

8. The connecting rod according to claim 5, further comprising a rib-shaped reinforcing element which, in the installed condition of the connecting rod, starting substantially from the first seat of the first arm, runs along a side which is forward or the rim which is forward, in the travel direction, of the dish-shaped seat, and ends in the third free end region.

9. The connecting rod according to claim 8, wherein at least one of a portion of the reinforcing element, a portion of the dish-shaped seat, and a portion of the third arm encloses at least one through-going recess.

10. The connecting rod according to claim 2, further comprising a shock absorber fastening seat for fastening of a shock absorber.

11. The connecting rod according to claim 10, wherein the shock absorber fastening seat is disposed in the third arm.

12. The connecting rod according to claim 10, wherein the shock absorber fastening seat is formed to be open at one end on a side which in the installed condition of the connecting rod is rearward in the travel direction.

13. The connecting rod according to claim 10, further comprising a stabilizer fastening seat for fastening of a stabilizer.

14. The connecting rod according to claim 13, wherein the stabilizer fastening seat is disposed in a region of the point of intersection of the first, second, and third arms.

15. The connecting rod according to claim 13, wherein the stabilizer fastening seat is formed to be open at one end on a side which in the installed condition of the connecting rod is rearward in the travel direction.

16. The connecting rod according to claim 2, wherein the first arm merging into the point of intersection widens toward the point of intersection in at least one portion.

17. The connecting rod according to claim 1, wherein the second arm has at least one weight-reducing recess comprising at least one of a perforation and a cavity open at one end.

18. The connecting rod according to claim 17, wherein the at least one recess within the second arm is provided on a side of the connecting rod which in the installed condition of the connecting rod points away from the roadway.

19. The connecting rod according to claim 17, wherein the at least one recess extends mostly over a length of the second arm.

20. The connecting rod according to claim 17, wherein the at least one recess is subdivided into compartments by at least one stiffening longitudinal wall.

21. The connecting rod according to claim 13, wherein the third arm has at least one weight-reducing recess comprising at least one of a perforation and a cavity open at one end.

22. The connecting rod according to claim 17, wherein the recess is disposed between the shock absorber fastening seat and the stabilizer fastening seat.

23. The connecting rod according to claim 13, further comprising a first stiffening flat element which, in the installed condition of the connecting rod, is disposed on a side which is rearward in the travel direction, between at least two of the second seat, the stabilizer fastening seat and the shock absorber fastening seat, and is connected to the adjoining second and third arms.

24. The connecting rod according to claim 23, wherein the first stiffening flat element, beginning at the second seat, ends underneath the stabilizer fastening seat for fastening of the stabilizer to the shock absorber fastening seat.

25. The connecting rod according to claim 23, further comprising a second stiffening flat element which, in the installed condition of the connecting rod, is disposed on a side which is forward in the travel direction, in a portion in the first free end region and the reinforcing element and is connected with the first seat and the reinforcing element.

26. The connecting rod according to claim 25, wherein each of the first and second flat stiffening elements is formed to be substantially planar.

27. The connecting rod according to claim 1, wherein the first, second, and third arms are not hollow-cast.

28. A connecting rod for a multiple connecting rod axle of a motor vehicle comprising: a substantially Y-shaped basic framework comprising a first arm, a second arm, and a third arm; a dish-shaped seat for a spring is disposed at least partly between the first arm and the third arm; and a rib-shaped reinforcing element; wherein the first arm comprises a first free end region having a first seat for linking the framework to an auxiliary frame or a vehicle body; wherein the second arm comprises a second free end region having a second seat for linking the framework to the auxiliary frame or the vehicle body; wherein a third arm comprises a third free end region having a third seat for linking the framework to a wheel carrier; wherein the framework is manufactured in one piece with the first, second, and third seats; wherein, in an installed condition of the connecting rod, the first arm is positioned in a travel direction forward of the second arm; wherein the dish-shaped seat has a rim joined at least partly via at least one connecting region to at least one of the arms between which the dish-shaped seat is disposed; wherein the rib-shaped reinforcing element, in the installed condition of the connecting rod, starting substantially from the first seat or the first arm, runs along a side which is forward or the rim which is forward, in the travel direction, of the dish-shaped seat, and ends in the third free end region; and wherein at least one of a portion of the reinforcing element, a portion of the dish-shaped seat, and a portion of the third arm encloses at least one through-going recess.

29. A connecting rod for a multiple connecting rod axle of a motor vehicle comprising: a substantially Y-shaped basic framework comprising a first arm, a second arm, and a third arm; a dish-shaped seat for a spring, the dish-shaped seat being disposed at least partly between the first arm and the third arm; a shock absorber fastening seat for fastening of a shock absorber; a stabilizer fastening seat for fastening of a stabilizer; and a first stiffening flat element; wherein the first arm comprises a first free end region having a first seat for linking the framework to an auxiliary frame or a vehicle body; wherein the second arm comprises a second free end region having a second seat for linking the framework to the auxiliary frame or the vehicle body; wherein a third arm comprises a third free end region having a third seat for linking the framework to a wheel carrier; wherein the framework is manufactured in one piece with the first, second, and third seats; wherein, in an installed condition of the connecting rod, the first arm is positioned in a travel direction forward of the second arm; wherein the dish-shaped seat is disposed laterally approximately at a height of a point of intersection of the first, second, and third arms; wherein the first stiffening flat element, in the installed condition of the connecting rod, is disposed on a side which is rearward in the travel direction, between at least two of the second seat, the stabilizer fastening seat and the shock absorber fastening seat, and is connected to the adjoining second and third arms; and wherein the first stiffening flat element, beginning at the second seat, ends underneath the stabilizer fastening seat for fastening of the stabilizer to the shock absorber fastening seat.

30. A connecting rod for a multiple connecting rod axle of a motor vehicle comprising: a substantially Y-shaped basic framework comprising a first arm, a second arm, and a third arm; a dish-shaped seat for a spring, the dish-shaped seat being disposed at least partly between the first arm and the third arm; a shock absorber fastening seat for fastening of a shock absorber; a stabilizer fastening seat for fastening of a stabilizer; a first stiffening flat element; and a second stiffening flat element; wherein the first arm comprises a first free end region having a first seat for linking the framework to an auxiliary frame or a vehicle body; wherein the second arm comprises a second free end region having a second seat for linking the framework to the auxiliary frame or the vehicle body; wherein a third arm comprises a third free end region having a third seat for linking the framework to a wheel carrier; wherein the framework is manufactured in one piece with the first, second, and third seats; wherein, in an installed condition of the connecting rod, the first arm is positioned in a travel direction forward of the second arm; wherein the dish-shaped seat is disposed laterally approximately at a height of a point of intersection of the first, second, and third arms; wherein the first stiffening flat element, in the installed condition of the connecting rod, is disposed on a side which is rearward in the travel direction, between at least two of the second seat, the stabilizer fastening seat and the shock absorber fastening seat, and is connected to the adjoining second and third arms; and wherein the second stiffening flat element, in the installed condition of the connecting rod, is disposed on a side which is forward in the travel direction, in a portion in the first free end region and the reinforcing element and is connected with the first seat and the reinforcing element.

* * * * *